United States Patent [19] [11] Patent Number: 4,995,832
Thommen et al. [45] Date of Patent: Feb. 26, 1991

[54] CONNECTOR FOR CONNECTING TO HELICALLY CORRUGATED CONDUIT

[75] Inventors: Robert L. Thommen, Indianapolis; Jihan J. Mohammed, Greenwood, both of Ind.

[73] Assignee: Specialty Connector Company, Inc., Franklin, Ind.

[21] Appl. No.: 427,585

[22] Filed: Oct. 26, 1989

[51] Int. Cl.⁵ .......................................... H01R 17/04
[52] U.S. Cl. .................................. 439/578; 439/583; 29/857; 285/903
[58] Field of Search ............................... 439/578–585, 439/840, 841; 285/318, 903; 29/828, 820, 857, 861

[56] References Cited

U.S. PATENT DOCUMENTS

| 3,291,895 | 12/1966 | Van Dyke | 439/578 |
| 3,295,872 | 1/1967 | Kragle | 285/318 |
| 4,046,451 | 9/1977 | Juols et al. | 439/583 |
| 4,824,400 | 4/1989 | Spinner | 439/578 |
| 4,824,421 | 4/1989 | Spinner | 439/584 |

FOREIGN PATENT DOCUMENTS

| 3422549 | 12/1985 | Fed. Rep. of Germany | 439/578 |
| 1371609 | 10/1974 | United Kingdom | 285/903 |

Primary Examiner—David Pirlot
Attorney, Agent, or Firm—Woodard, Emhardt, Naughton, Moriarty & McNett

[57] ABSTRACT

A connector for connecting to helically corrugated conduit which comprises a bolt member having a passageway therethrough and a connecotr body having a hollow end portion for receiving the bolt member, In addition, the connector includes a helical spring within the passageway which is adapted to be received within the helical corrugations of the conduit. The connector further includes a means for forcing the bolt member into the hollow end portion of the body of the connector to squeeze the spring between the bolt member and connector body whereby the spring is axially forced against the corrugations.

In addition, a method of connecting a helically corrugated conduit to a connector is disclosed which comprises the steps of (1) sliding a hollow bolt member having an internal flange over an end portion of the conduit until a part of the end portion closest to the end is uncovered; (2) screwing a helical spring onto a part of the uncovered end portion of the conduit until the entire spring is within the corrugations of the conduit; (3) sliding the bolt member axially over the spring until the internal flange of the bolt member contacts the spring; and (4) forcing the bolt member into a hollow end portion of the body of the connector.

14 Claims, 4 Drawing Sheets

CONNECTOR FOR CONNECTING TO HELICALLY CORRUGATED CONDUIT

BACKGROUND OF THE INVENTION

This invention relates generally to a connector for coupling to the end portion of a helically corrugated conduit such as a coaxial conductor.

Connectors have existed in the past for coupling to a helically corrugated conduit. For instance, U.S. Pat. No. 4,824,401 (Spinner) taught the use of a plastic ring which is placed around the corrugated outer conductor between a coupling ring and a metal casing where the coupling ring is engagable to the metal casing. The plastic ring is positioned with one end face against a radial annular surface of the coupling ring and with its opposing end face against a radial annular surface of the metal casing. The plastic ring is then compressed when the coupling ring is threadingly tightened to the metal casing thereby resulting in the plastic ring being forced inwardly against the corrugated outer conductor. The above and other similar assemblies which provide a radial force to the associated conduit have the disadvantage that the radial force applied to the conduit tends to result in damage to the conduit.

Another connector for coupling to a helically corrugated conduit, disclosed in U.S. Pat. No. 3,757,583 (Staschewski), provides an external flange or collar which extends radially from along a crest line of the corrugations of the conduit. The flange is placed into abutment with a helically configured internal flange or collar of a coupling element by screwing such element onto the end of the conduit. The coupling element is then secured to a connector by a bolt or clamp.

Still another connector for coupling to a helically corrugated conduit is U.S. Pat. No. 4,687,272 (Spinner et al.). Spinner et al. discloses a flanged end section of a helically corrugated outer conductor against which a corrugated pipe nut abuts. A screw cap which is positioned around a portion of the helical conductor is then threadingly engaged to a connector. The screw cap cooperates with the corrugated pipe nut in such a manner that upon turning the screw cap along the connector, the nut is forced against the flanged end section of the conduit thus securing the flanged end section between the nut and an internal flange of the connector.

The above and other similar prior art connectors for coupling to a helically a corrugated conduit require a flange or collar be located either along the crest line of the helical corrugations of the conduit or at the end of the helically corrugated conduit. This requirement adds to the production cost of the helically corrugated conduit. Further, if the flange or collar is located only on the end of the conduit, additional effort and tools are required to alter the length of the conduit in the field.

SUMMARY OF THE INVENTION

One embodiment of the present invention involves a connector for connecting to helically corrugated conduit which comprises a bolt member having a passageway therethrough and a connector body having a hollow end portion for receiving the bolt member. In addition, the connector includes a helical spring within the passageway which is adapted to be received within the helical corrugations of the conduit. The connector further includes a means for forcing the bolt member into the hollow end portion of the body of the connector to squeeze the spring between the bolt member and connector body whereby the spring is axially forced against the corrugations.

Another embodiment of the present invention comprises a method of connecting a helically corrugated conduit to a connector. The method comprises the steps of (1) sliding a hollow bolt member having an internal flange over a end portion of the conduit until a part of the end portion closest to the end is uncovered; (2) screwing a helical spring onto a part of the uncovered end portion of the conduit until the entire spring is within the corrugations of the conduit; (3) sliding the bolt member axially over the spring until the internal flange of the bolt member contacts the spring; and (4) forcing the bolt member into a hollow end portion of the body of the connector.

Still another embodiment of the present invention involves a helically corrugated conduit and connector assembly which comprises a conduit having a helically corrugated outer surface. The assembly further includes a bolt member having a passageway therethrough and a connector body having a hollow end portion for receiving the bolt member. In addition, the assembly includes a helical spring within the passageway and adapted to be received within the helical corrugations of the conduit. The assembly further includes a means for forcing the bolt member into the hollow end portion of the body of the connector to squeeze the spring between the bolt member and connector body whereby the spring is axially forced against the corrugations.

One object of the invention is to provide an improved connector for connecting to helically corrugated conduit.

Another object of the invention is to provide an improved method of connecting a helically corrugated conduit to a connector.

Yet another object of the invention is to provide an improved helically corrugated conduit and connector assembly.

Still another object of the invention is to provide a connector for connecting to helically corrugated conduit where force is applied to the corrugations of the conduit in an axial direction.

A further object of the invention is to provide a connector for connecting to helically corrugated conduit wherein the helically corrugated conduit does not have to be specially manufactured with flange thereupon.

Another object of the invention is to provide a connector for connecting to helically corrugated conduit wherein the electrical grounding of the outer connector of the conduit is improved.

Other objects and benefits of the present invention can be discerned from the following written description and accompanying drawings.

DESCRIPTION OF THE PREFERRED EMBODIMENT

Figure 1:
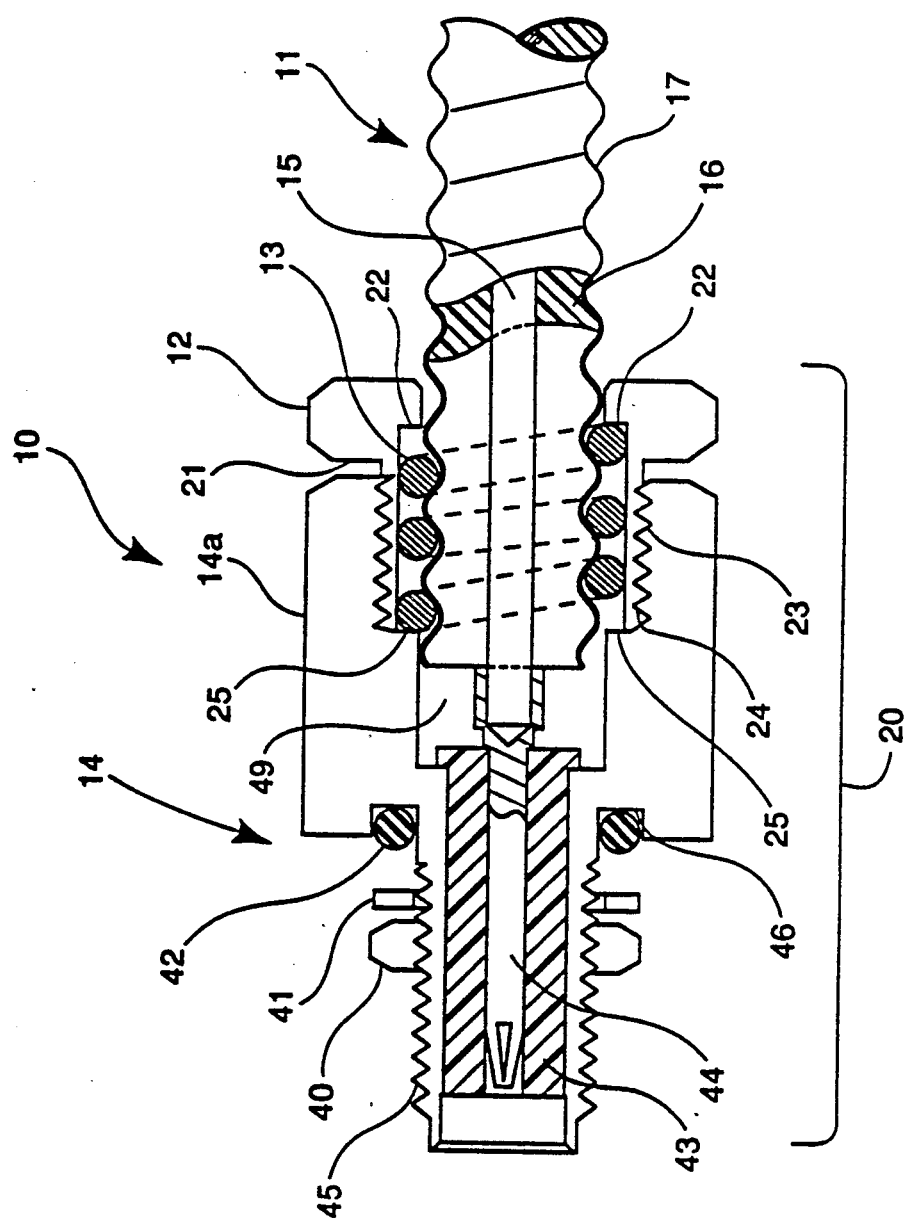
FIG. 1 is a side elevational view partially in cross section of the helically corrugated conduit and connector assembly of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices and methods, and such further applications of the principles of the invention as illustrated therein being contemplated as would normally occur to one skilled in the art to which the invention relates.

Figure 2:
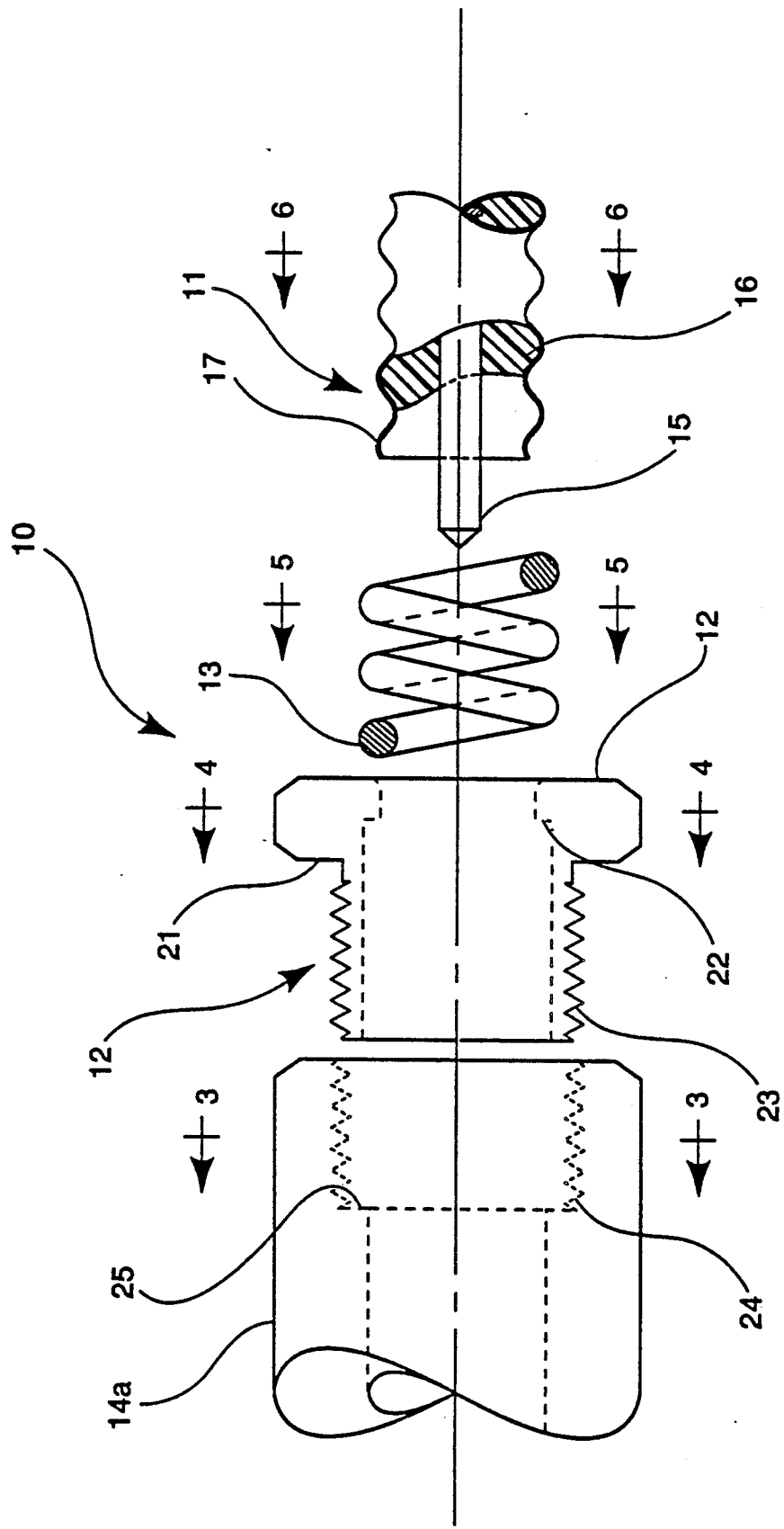
FIG. 2 is an exploded side elevational view partially in cross section of the helically corrugated conduit and connector assembly of FIG. 1.

Referring now to FIGS. 1 and 2, there is illustrated a helically corrugated conduit and connector assembly 10. The assembly in general comprises a helically corrugated conduit 11 and a connector 20 (see FIG. 1) while connector 20 in general comprises a bolt member 12, a spring member 13 and a connector body 14.

Figure 6:
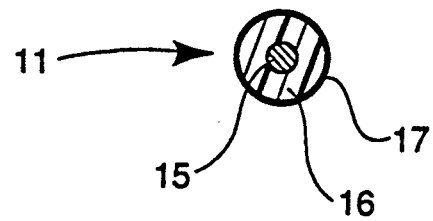
FIG. 6 is a cross-sectional view taken along the line 6—6 of FIG. 2.

Helically corrugated conduit 11 comprises an inner conductor 15, dielectric material 16 and an outer conductor 17 as shown in FIG. 6. The maximum outer diameter of either end of outer conductor 17 of conduit 11 is substantially equal to the maximum outer diameter of its remaining portion. As a result, production and/or field service costs associated with applying an external flange or collar on the ends of the conduit can be avoided.

Figure 4:
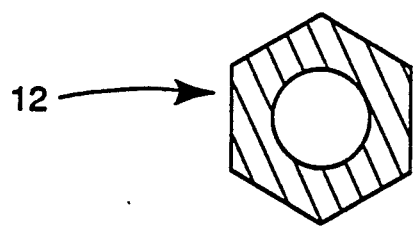
FIG. 4 is a cross-sectional view taken along the line 4—4 of FIG. 2.
Figure 5:
FIG. 5 is a cross-sectional view taken along the line 5—5 of FIG. 2.

Bolt member 12 has a passageway extending entirely therethrough. One end portion of bolt member 12 includes an external flange 21 and an internal flange 22 while the other end portion includes externally threaded portion 23. The end portion of bolt member 12 which includes external flange 21 is formed in the shape of a hexagon as can be seen in FIG. 4.

Spring member 13, shown in FIGS. 1, 2, 5, 7A and 7B, is shaped in the form of a helix and is composed of an electrically conductive metallic material. Since spring member 13 is tightly interposed between bolt member 12 and the outer conductor 17 of conduit 11, it aids in electrical grounding of outer conductor 17.

Figure 3:
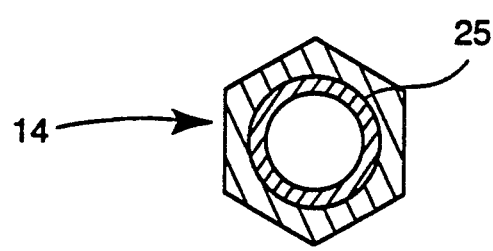
FIG. 3 is a cross-sectional view taken along the line 3—3 of FIG. 2.

Connector body 14 has a passageway 49 extending entirely therethrough. Connector body 14 includes an end portion 14a which is illustrated in FIGS. 1-3. Connector body end portion 14a is externally configured in the shape of a hexagon. Connector body end portion 14a includes internally threaded portion 24. Internally threaded portion 24 of connector body end portion 14a is adapted to cooperate in threading engagement with externally threaded portion 23 of bolt member 12. Connector body end portion 14a additionally includes an internal flange 25.

Connector body 14 further includes insulator 43 positioned within its passageway. Additionally, connector body 14 possesses an externally threaded portion 45 which cooperates in threading engagement with a hexagonally configured nut 40. Gasket 42 is positioned in recess 46 of connector body 14. Interposed between nut 40 and gasket 42 is washer 41. Brass pin 44 is secured to the end of inner conductor 15 by crimping or solder.

FIG. 1 shows assembly 10 in its assembled state. When assembly 10 is in such a state, one end of spring member 13 is in contact with internal flange 25 of connector body end portion 14a and the other end is in contact with internal flange 22 of bolt member 12. Since spring member 13, in its relaxed state, is longer than the shortest distance between internal flange 25 of connector body end portion 14a and internal flange 22 of bolt member 12 in the assembled state, spring member 13 is compressed axially. The above axial compression results in spring member 13 being forced against outer conductor 17 in an axial direction thus creating sufficient friction between spring member 13 and outer conductor 17 to hold conduit 11 from being turned or pulled out of connector end portion 14a without damaging or destroying conduit 11.

Figure 7A:
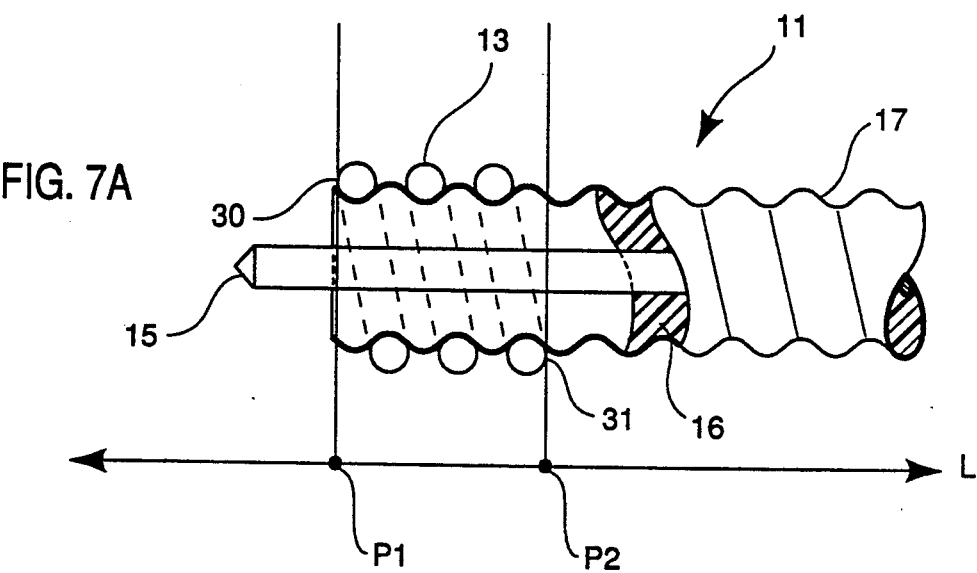
FIG. 7A is a side elevational view partially in cross section of the spring and conduit of the helically corrugated conduit and connector assembly of FIG. 1 where the spring is in its expanded state.
Figure 7B:
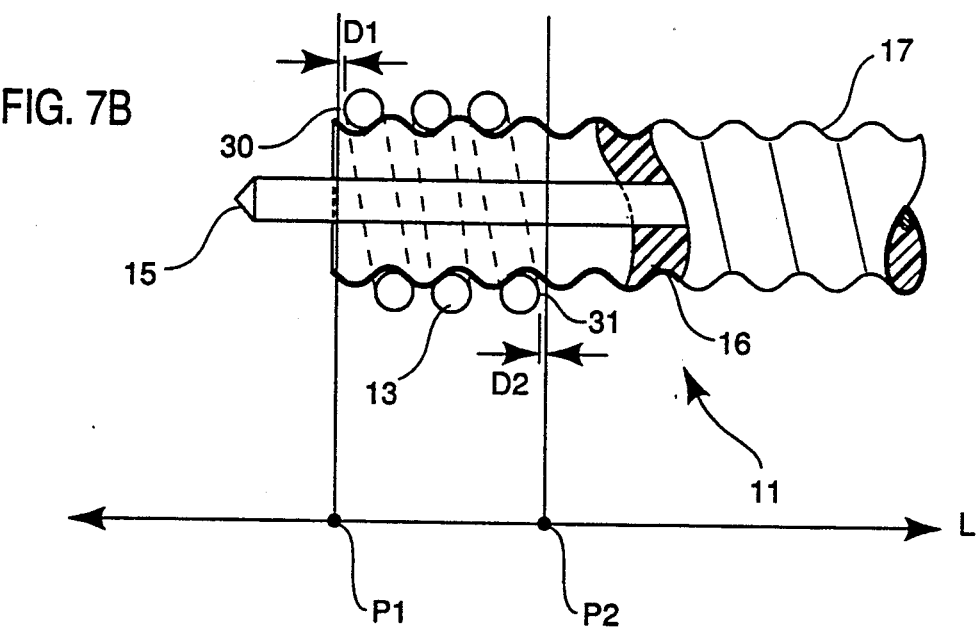
FIG. 7B is a side elevational view partially in cross section of the spring and conduit of the helically corrugated conduit and connector assembly of FIG. 1 where the spring is in its axially compressed state.

FIGS. 7A and 7B show spring 13 in its relaxed and axially compressed state respectively. In both FIGS. 7A and 7B, line L is parallel to the axis of conduit 11 and further the distance between point P1 and P2 in FIG. 7A is equal to the distance between point P1 and P2 in FIG. 7B. When spring member 13 is in its relaxed state, the outermost linear point at its first end 30 is indicated by point P1 on line L and the outermost linear point at its second end 31 is indicated by point P2 on line L. However, when assembly 10 is assembled and spring member 13 is axially compressed as described above, the outermost linear point at its first end 30 is displaced inwardly by a distance D1 relative to the relaxed state and the outer most linear point at its second end 31 is displaced inwardly by a distance D2 relative to the relaxed state. Such displacement causes spring member 13 to be forced axially inward against corrugated outer conductor 17. Securing the conduit to the end portion of a connector by applying axial compression to the conduit (as opposed to radial compression) reduces damage to the conduit during connection of the conduit to the connector.

In the method of the present invention, a helically corrugated conduit, such as conduit 11, can be connected to an end portion of the body of a connector, such as connector body end portion 14a. In the first step of the invention, a hollow bolt member having an internal flange, such as bolt member 12 and its respective internal flange 22, is slide over an end portion of the conduit until a part of the end portion closest to the end is uncovered. A spring, such as spring 13, is then screwed onto a part of the uncovered end portion of the conduit until the entire spring is within the corrugations of the conduit. The bolt member is then moved axially over the spring until the internal flange of the bolt member contacts the spring. The bolt member is then connected to the end portion of the connector body. The two members mentioned above can be connected by screwing external threads of the bolt member, such as external threads 23 of bolt member 12, into meshing engagement with internal threads of the body of the connector, such as internal threads 24 of connector body end portion 14a.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the bolt member 12 may screw onto the outside of end portion 14a of connector body 14 instead of into the end portion of the connector body.

What I claim is:

1. A connector for connecting to helically corrugated conduit comprising:
   a bolt member having a passageway therethrough;
   a connector body having a hollow end portion for receiving the bolt member;
   a helical spring within the passageway and adapted to be received within the helical corrugations of the conduit; and
   means for forcing said bolt member into said hollow end portion to squeeze said spring between said bolt member and connector body whereby said spring is axially forced against the corrugations.

2. The connector of claim 1 wherein said spring is composed of a conductive material.

3. The connector of claim 1 wherein the end portion of said corrugated conduit which receives said spring has a maximum outer diameter which is substantially equal to the maximum outer diameter of the remaining portion of said corrugated conduit.

4. The connector of claim 1 wherein one end portion of said bolt member is externally threaded and the hollow end portion of said connector body is internally threaded.

5. The connector of claim 1 wherein one end portion of said bolt member includes an internal flange.

6. The connector of claim 5 wherein the other end portion of said bolt member further includes an external flange.

7. The connector of claim 6 wherein said external flange is hexagonally configured.

8. A method of connecting a helically corrugated conduit to a connector, said method comprising the steps of:
   sliding a hollow bolt member having an internal flange over an end portion of the conduit until a part of the end portion closest to the end is uncovered;
   screwing a helical spring onto a part of the uncovered end portion of the conduit until the entire spring is within the corrugations of the conduit;
   sliding the bolt member axially over the spring until the internal flange of the bolt member contacts the spring; and
   forcing the bolt member into a hollow end portion of the body of the connector.

9. The method of connecting a helically corrugated conduit to a connector of claim 8 wherein said connecting step includes screwing the bolt member into meshing relationship with the body of the connector.

10. A helically corrugated conduit and connector assembly, comprising:
    a conduit having a helically corrugated outer surface;
    a bolt member having a passageway therethrough;
    a connector body having a hollow end portion for receiving the bolt member;
    a helical spring within the Passageway and received within the helical corrugations of the conduit; and
    means for forcing said bolt member into said hollow end portion to squeeze said spring between said bolt member and connector body whereby said spring is axially forced against the corrugations.

11. The helically corrugated conduit and connector assembly of claim 10 wherein said spring is comPosed of a conductive material.

12. The helically corrugated conduit and connector assembly of claim 10 wherein the end portion of said corrugated conduit which receives said spring has a maximum outer diameter which is substantially equal to the maximum outer diameter of the remaining portion of said corrugated conduit.

13. The helically corrugated conduit and connector assembly of claim 10 wherein one end portion of said bolt member includes an internal flange.

14. A connector for connecting to helically corrugated conduit comprising:
    a bolt member having a passageway therethrough for receiving the conduit;
    a connector body having a hollow end portion for receiving the conduit;
    a helical spring within the hollow end portion and adapted to be received within the helical corrugations of the conduit; and
    means for moving said bolt member relative to said connector body to squeeze said spring between said bolt member and connector body whereby said spring is axially forced against the corrugations.

* * * * *